US008919701B2

(12) United States Patent
Salles et al.

(10) Patent No.: US 8,919,701 B2
(45) Date of Patent: Dec. 30, 2014

(54) INFLATABLE DELTA-SHAPED TRACTION KITE

(75) Inventors: Raphael Salles, Vic la Gardiole (FR); Sylvain Peretti, Caussols (FR)

(73) Assignee: F One Sarl, Perols (FR)

( * ) Notice: Subject to any disclaimer, the term of this patent is extended or adjusted under 35 U.S.C. 154(b) by 83 days.

(21) Appl. No.: 12/525,153

(22) PCT Filed: Jan. 31, 2008

(86) PCT No.: PCT/FR2008/050160
§ 371 (c)(1),
(2), (4) Date: Jul. 30, 2009

(87) PCT Pub. No.: WO2008/104667
PCT Pub. Date: Sep. 4, 2008

(65) Prior Publication Data
US 2010/0090064 A1   Apr. 15, 2010

(30) Foreign Application Priority Data

Jan. 31, 2007 (FR) .................................. 07 52989
Jun. 11, 2007 (FR) .................................. 07 55664

(51) Int. Cl.
| A63H 27/08 | (2006.01) |
| B64C 31/06 | (2006.01) |
| F41J 9/08 | (2006.01) |
| B63B 35/79 | (2006.01) |
| B63H 9/06 | (2006.01) |

(52) U.S. Cl.
CPC ............. B64C 31/06 (2013.01); B63B 35/7976 (2013.01); B63B 35/7979 (2013.01); B63H 9/0614 (2013.01)
USPC ................................... 244/153 R; 244/155 A

(58) Field of Classification Search
USPC ........................ 244/153 R, 154, 155 A, 155 R
See application file for complete search history.

(56) References Cited

U.S. PATENT DOCUMENTS

| 4,708,078 A * | 11/1987 | Legaignoux et al. ..... 114/102.23 |
| 6,514,115 B2 * | 2/2003 | Harich .............................. 446/34 |

(Continued)

FOREIGN PATENT DOCUMENTS

| DE | 20107925 U1 | 2/2002 |
| DE | 102004042669 A1 | 8/2005 |

(Continued)

OTHER PUBLICATIONS

Andy Wardley, The Camel Goes Kite Surfing, Jul. 23-27, 2001, Presented at the O'Reilly Perl Conference 5.*

(Continued)

*Primary Examiner* — Tien Dinh
*Assistant Examiner* — Michael A Fabula
(74) *Attorney, Agent, or Firm* — Westerman, Hattori, Daniels & Adrian, LLP

(57) ABSTRACT

Inflatable fraction kite (1) and the system for managing the traction power, the direction and the transient maneuvers thereof, shaped as a negative dihedron, of the type known as 'C-shape' or 'C-kite', and comprising load-bearing riggers and riggers used to manage the direction and trim, the kite (1) being characterized in that in flight it is designed to be delta-shaped and for this reason its leading edge (10), when laid flat, has a curvature such that, for each half-wing (12, 13) of the kite, the angle (α) formed by the tangent (S) to said central point (A) and the tangent (T) at a given point (B) increases as said given point (B) moves from the forward central point (A) toward the end (14, 15) of the kite (1) and in that, in the first third of said half-wing (12, 13) of the kite, from the forward central point (A) and in the direction of one end (14, 15), said angle (α) is greater than 15°.

13 Claims, 4 Drawing Sheets

(56) References Cited

U.S. PATENT DOCUMENTS

| | | | |
|---|---|---|---|
| 6,869,047 B2* | 3/2005 | Pouchkarev | 244/155 A |
| 7,014,149 B2* | 3/2006 | Lynn | 244/153 R |
| 7,621,485 B2* | 11/2009 | Logosz et al. | 244/155 A |
| 7,810,759 B2* | 10/2010 | Eberle et al. | 244/155 A |
| 7,971,829 B2* | 7/2011 | See et al. | 244/155 A |
| 2002/0084384 A1* | 7/2002 | Bellacera | 244/155 A |
| 2002/0187717 A1 | 12/2002 | Harich | |
| 2003/0132348 A1* | 7/2003 | Lynn | 244/146 |
| 2003/0154898 A1* | 8/2003 | Lagaignoux | 114/102.1 |
| 2004/0004160 A1* | 1/2004 | Pouchkarev | 244/146 |
| 2004/0065780 A1* | 4/2004 | Bellacera | 244/155 A |
| 2005/0230556 A1* | 10/2005 | Legaignoux et al. | 244/153 R |
| 2006/0186273 A1* | 8/2006 | Eberle et al. | 244/152 |
| 2006/0226294 A1* | 10/2006 | Logosz et al. | 244/152 |
| 2007/0120016 A1* | 5/2007 | Eberle et al. | 244/153 R |
| 2008/0035796 A1* | 2/2008 | See et al. | 244/155 A |
| 2008/0067291 A1* | 3/2008 | Logosz et al. | 244/155 A |

FOREIGN PATENT DOCUMENTS

| | | |
|---|---|---|
| DE | 102004051708 A1 | 4/2006 |
| FR | 2873093 A1 | 1/2006 |

OTHER PUBLICATIONS

ABC-of-Kite Surfing, Kite Surfing Techniques—Water Re-launch, 2007.*

Leading edge inflatable kite. Apr. 22, 2013. In Wikipedia, The Free Encyclopedia. <http://en.wikipedia.org/w/index.php?title=Leading_edge_inflatable_kite&oldid=551617093>.*

Seabreeze.com.au Forums; Gear Review-F-One Bandit; Sep. 23, 2007-Oct. 21, 2007; <http://www.seabreeze.com.au/forums/Kitesurfing/Review/F-One-Bandit/>.*

Johy Bryja; Trade Secrets: Mat Pendle; Mar. 9, 2007; <http://www.sbckiteboard.com/gear_article?news_id=73&view=print>.*

International Search Report of PCT/FR2008/050160, Mailing Date of Aug. 21, 2008.

* cited by examiner

INFLATABLE DELTA-SHAPED TRACTION KITE

BACKGROUND OF THE INVENTION (1) Field of the Invention

The present invention relates to the manufacture of an inflatable traction kite as well as its system for managing the traction power, the direction and the transient manoeuvres.

This invention is related to the field of the sail traction of aquatic boards, and other beach vehicles, boats as well as of skiers, surfers and adapted road vehicles.

(2) Description of the Prior Art

It is known to use two types of inflatable traction kites:
the so-called flat kites, which generally have a ratio between the flat wing span, i.e. the distance separating the two ends of the kite, and the in-flight wing span, i.e. the width of the kite during the flight, which is lower than about 1.5. Their control occurs by means of a complex rigger system arranged along the wing span.
the so-called kites the ratio between the flat and the in-flight wing span of which is larger than about 1.5, and which are of the type referred to as "C-shape" or "C-kite". These kites have the characteristic shape of a negative dihedron, i.e. a regular and deep arch. They have the peculiarity of being able to fly and being controlled by riggers located at its ends.

These riggers are generally four in total and of a length of about twenty meters, the first two being located at the front ends of the kite are defined as bearing riggers and the other two riggers are located at the rear of the ends and used for managing the direction and the trim.

The bearing riggers are connected to the pilot by means of a harness and the direction riggers are hooked in on both sides of a sliding bar on a rigger uniting the bearing riggers over the last meter at the level of the pilot.

The bearing riggers receive the largest portion of the aerodynamic load, they are generally located slightly forward of the resultant of the aerodynamic forces (RAF), in order to confer to the kite a pitching torque that permits to transfer part of these forces to the rear riggers, which therefore ensure the control of the trim by the pilot.

When the rear riggers are actuated asymmetrically, they induce a deformation of the kite, which, by generating a differential aerodynamic drag, permits to control the direction of the kite.

This control system is generally combined with other riggers located on the leading edge and that enter into operation to assist managing the phases out of flight, take-off or to ensure maintaining the kite in the vicinity of the pilot in the event the control bar is released or to assist controlling the trim.

These systems considerably complicate the management of the kite both in flight and on the ground, on the other hand, the management of a high number of riggers is a source of non-negligible and potentially dangerous errors.

The wing profile of the conventional self-bearing kites implies that the bearing riggers and the control riggers are not far separated from the position of the resultant of the aerodynamic forces. The wing profile of these kites has therefore a regular curvature of the leading edge and the trailing edge towards an equilibrium point located slightly behind the bearing riggers and before the riggers for managing the direction.

Since this kite shape is stable only when there exists a sufficient lift for maintaining the kite during the flight, the anchoring points of the bearing riggers should be placed relatively close to the axis of equilibrium, thus inducing a limit for the slack capacity beyond a minimum incidence after which the kite could no longer ensure its lift and would nose dive onto the ground without the pilot being able to ensure its control.

This minimum incidence is potentially dangerous in the event of an increase of wind, because the force thus generated can cause a loss of control by the pilot.

On the other hand, when the kite is in slacked position, the arrangement at the ends of the kite of the bearing riggers induces a decrease of the wing span and a reduction of the angle of incidence of the last third of the kite, thus cancelling its directional role.

Regaining the control of the direction implies a recovery of incidence of the entire kite, which is potentially dangerous in case of an increase of wind.

The multiple systems of riggers presently available do not provide any suitable solution for these problems, therefore the present invention is aimed at coping with this lack.

SUMMARY OF THE INVENTION

The object of the present invention is therefore to provide a kite that has features permitting to bring the slacked point of equilibrium well beyond the present standards, to impede the kite from being able to nose dive onto the ground, to impede the kite from remaining blocked on its leading edge in the event of falling on the water, and also to limit the number of riggers.

The object of the invention is to combine a particular and original geometry of the kite with a suitable system of riggers in order to perfectly manage the degree of lift and control of the kite over its full range of use and to simplify its implementation in the transient flight phases (take-off or total neutralization of the fraction).

The inflatable traction kite according to the invention has a negative dihedron shape, i.e. of the type referred to as "C-shape" or "C-kite", and comprises bearing riggers and riggers used for managing the direction and the trim.

This kite is essentially characterized in that it is configured so as to have a delta shape during the flight, and to this end its leading edge has, when laid flat, a curvature such that, for each half wing of the kite, the angle formed by the tangent to said central point with the tangent at a given point, when said given point moves from the forward central point to the end of the kite in the first third of said half wing of the kite, said angle is larger than 15°.

According to another feature, in the first third of said half wing of the kite from the forward central point and toward an end, said angle is increasing.

The delta shape of the kite as defined above provides the kite with a higher stability, which permits to modify the arrangement of the riggers so as to maintain the wing span during the flight, and not to reduce the latter during the slack.

Thus, according to an additional feature of the traction kite according to the invention, it includes, on the one hand, a ramified bearing rigger the ramifications of which are arranged in a median portion of the kite that represents between seven and eight tenths of the entire kite; and, on the other hand, two control riggers that are each made integral with it externally to said median portion.

This arrangement permits, besides maintaining the wing span during the flight, a slight increase of the differential incidence of the ailerons, i.e. of the portions of the kite tangent to the control riggers, and to increase their drag, which results into stabilizing the kite about its yaw axis.

According to another additional feature of the traction kite according to the invention, the bearing rigger is ramified into two secondary riggers, each ramified into two upper riggers each connected to the same half wing of the kite, one of which at the outer edge of the median portion.

According to another additional feature of the traction kite according to the invention, the ramification or ramifications are carried out each through a pulley.

It should also be noted that the user's safety is advantageously ensured by a release device permitting to cut off the power of the kite in a case of emergency, by removing the connection between the harness and the bar, while maintaining however a connection between the kite and the harness, of the type generally referred to as fifth rigger, in order not to risk losing same.

With the kite according to the invention, it is possible to achieve the same "fifth rigger" effect without using a fifth rigger. Thus, to this end, the bearing rigger is ramified into two connections, both of which can be made integral with the harness, one of which is connected to said harness and can be dropped.

After having released the control bar, the manoeuvring by pulling of a handle permits to instantaneously open the connection that unites the harness to the connection connected to the bearing rigger and the bar, so that the latter freely moves upwards, this permitting a full tilting motion of the kite onto its back, thus fully cancelling its power, the bearing rigger, and hence the kite, remaining connected to the harness through the other connection.

The advantages and the features of the traction kite according to the invention will more clearly appear from the following description, with reference to the attached drawing, which represents a non-restrictive embodiment of same.

DETAILED DESCRIPTION OF THE PREFERRED EMBODIMENTS

Figure 1:
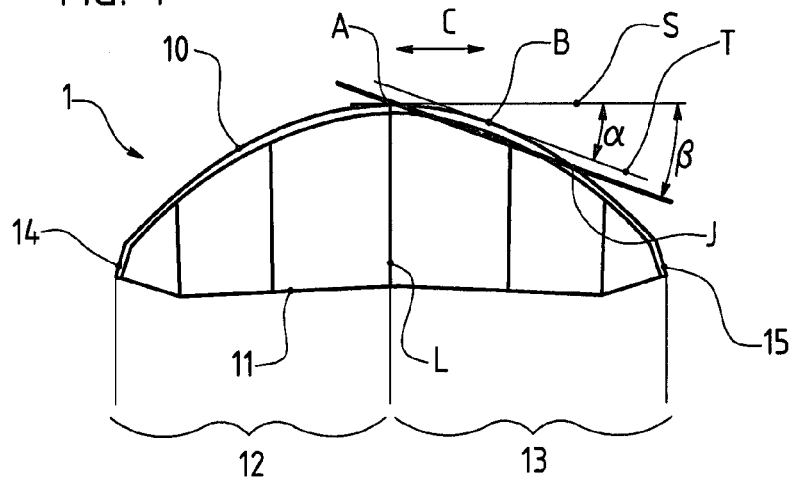
FIG. 1 shows a schematic plan view of a kite according to the invention.

In FIG. 1 can be seen a kite 1, which comprises a leading edge 10, a trailing edge 11, a forward central point A through which passes a line L separating the kite 1 into two half wings 12 and 13 of the kite, each comprising an end 14 and 15, respectively.

According to the invention, the leading edge has a curvature such that, for each half wing 12 or 13 of the kite, the angle α formed by the tangent S to the forward central point A with the tangent T at a given point B increases when this given point moves from the forward central point A towards the end 14 or 15 of the kite 1. In particular, this tangent T to the point B that is located in the first third C of each half wing 12, 13 of the kite, from the central point A, forms with the tangent S an angle α larger than 15°, in this case and preferably 21°.

It should be noted that, when reference is made to the curvature of the leading edge, this is the mean curvature of the latter, knowing that the kites of this type are in most cases formed by an assembling of elements, which assembling can impart to the curvature a broken line profile.

Figure 1A:
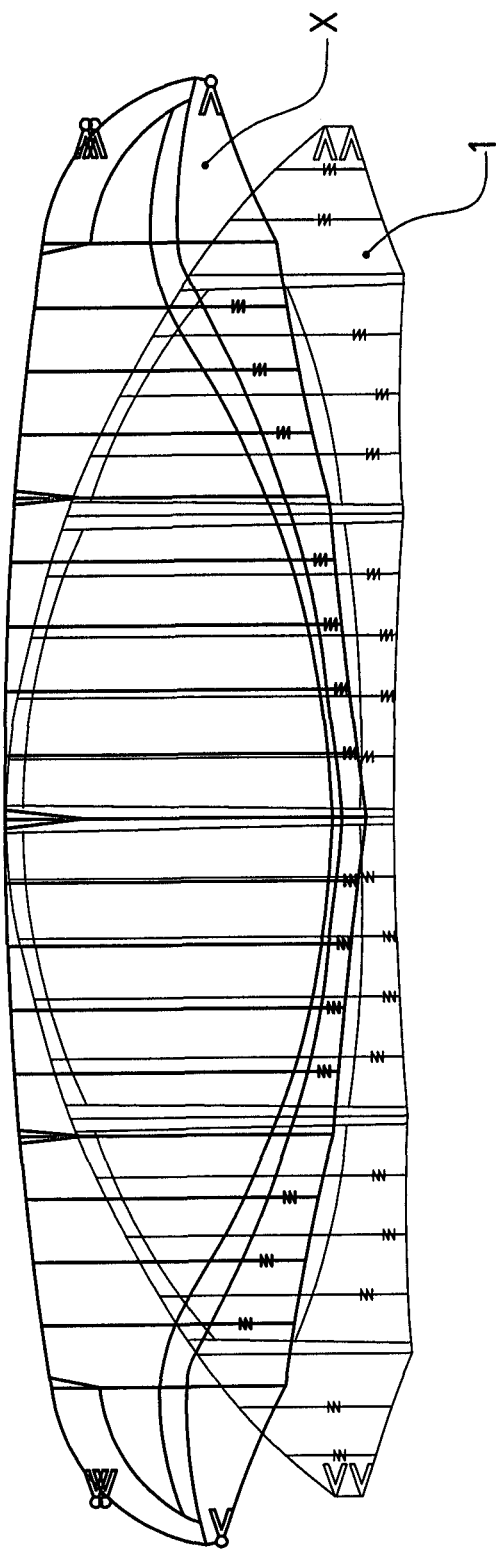
FIG. 1a is a view similar to FIG. 1 showing a kite according to the invention compared to a state-of-the-art kite.

The inclination of the leading edge 10 with respect to the tangent to the central point A thus imparts a marked curvature to the kite 1. The FIG. 1a clearly shows the difference between the shape of a state-of-the-art kite X and the kite 1 according to the invention.

The curvature defined by the angle α generally depends on the size of each kite 1. Said curvature thus depends on the ratio between the wing span of the kite and said angle α.

In addition, this curvature of the leading edge 10 pretends to be continuous according to the embodiments visible in the figures. However, further embodiments, not shown, include curvatures having gaps and unevennesses, the role of which is namely to facilitate the straightening of the kite during the (re)take-off phase. Therefore, the invention relates to the curvature in its entirety, without taking into consideration the punctual additions or modifications of the angle α.

On the other hand, as can be seen in FIG. 1, it should be noted that the angle β, between the tangent S to the central point A and the straight line passing through said point A and a point J located at the half of each half wing 12, 13 of the kite, is larger than 10°, preferably larger than 15°.

Figure 2:
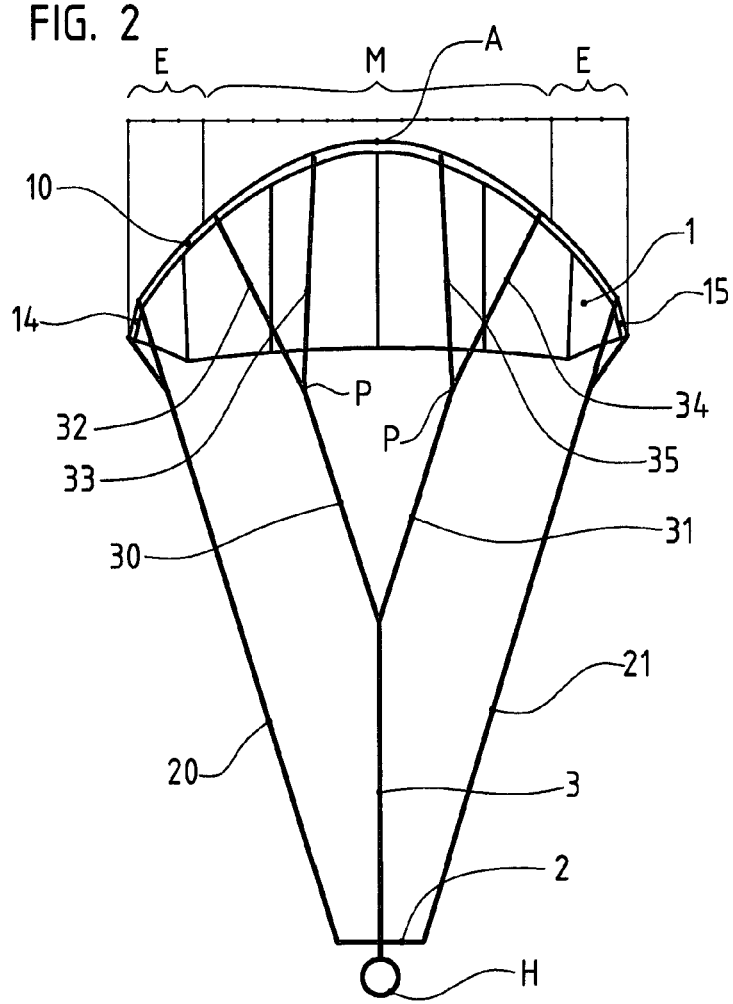
FIG. 2 shows a schematic plan view of the same kite and its system for managing the traction power, the direction and the transient manoeuvres.

In FIG. 2 we see the same kite 1 having the same features of shape and which suspension organs consisting of riggers are made integral with.

These riggers comprise namely two control riggers 20 and 21 that connect, each, an end 14 and 15, respectively, to a control bar 2 and that are used for managing the direction and the trim.

The suspension organs also comprise a bearing rigger 3 connected to the pilot H and being ramified into two secondary riggers 30 and 31, each one of them being ramified, through a pulley P, into two upper riggers 32 and 33, 34 and 35, respectively. The upper riggers 32 and 33 are made integral to the half wing 12 of the kite, while the upper riggers 34 and 35 are made integral to the half wing 13 of the kite.

The kite 1 comprises a median portion M, formed, in this case, by the union of 7/10 of each of the half wings 12 and 13 of the kite and externally to the median portion M, two extreme portions E, also referred to as ailerons, each formed of 3/10 of a half wing 12, 13 of the kite.

It should be noted that, in the example shown, the median area M is formed of 7/10 of the kite 1, but that it could be extended as far as to be formed of 8/10 of the kite 1, and such that each of the extreme portions E is formed of 1/10 of the kite 1.

The upper riggers 32, 33 and 34, 35 are arranged in the median portion M, at the level of the leading edge 10, in this case the upper riggers 32 and 34 are arranged at the edge of the median portion M, while the upper riggers 33 and 35 are arranged more centrally.

Each of the control riggers 20 and 21 is arranged in a portion E and, as can be seen in FIG. 2, they can be ramified.

The particular arrangement of the riggers has many advantages, which will be set forth in the light of the description of FIGS. 3a, 3b, 4a and 4b.

Figure 3A:
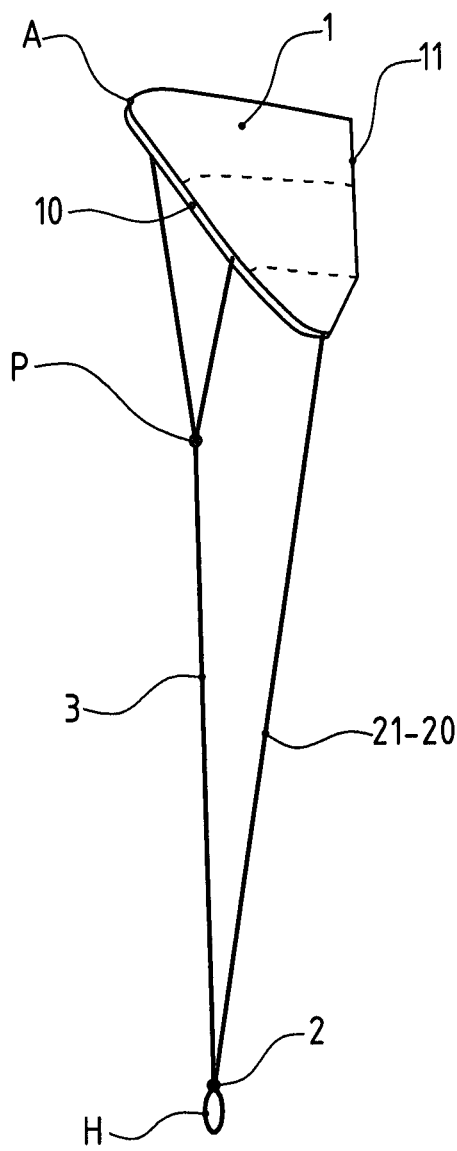
FIG. 3a shows a schematic profile view of the same kite during the flight in hauled position.
Figure 3B:
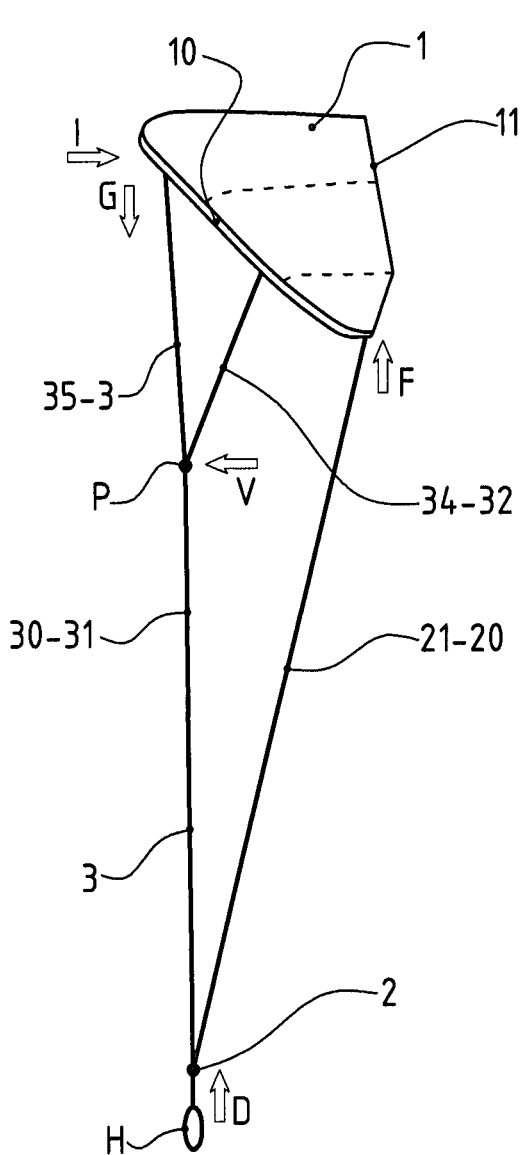
FIG. 3b shows a schematic profile view of the same kite during the flight in slacked position.

In FIGS. 3a and 3b, in which the kite 1 is shown in a profile view during the flight, one can observe that the particular curvature of its leading edge 10, and set forth in the description of FIG. 1, confers to same approximately the shape of a delta kite, which provides this kite with a greater stability about its longitudinal axis, compared to the presently known kites.

It should be noted that the delta shape of the kite has another advantage, indeed, when the kite 1 has dropped into the water or onto the ground on its leading edge 10, this delta shape impedes it from stabilizing in this position by causing it to naturally tilt onto a side, which is the natural take-off position, thus permitting that the pilot quickly regains the control of its kite.

Figure 4A:
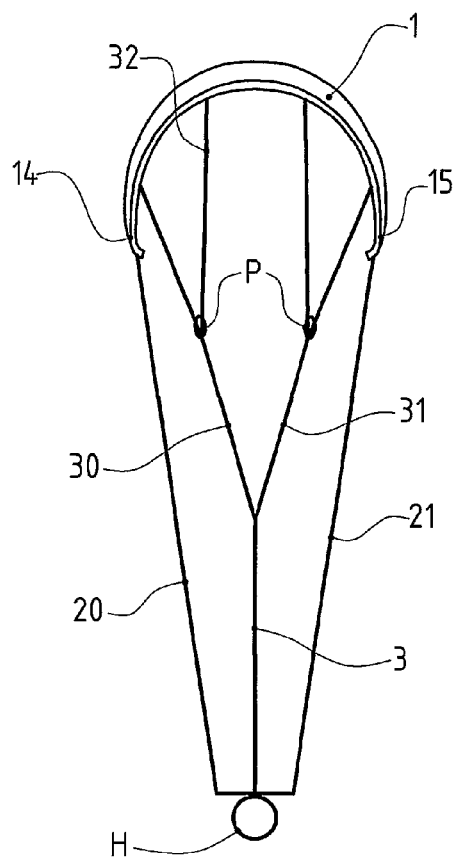
FIG. 4a shows a schematic front view of the same kite during the flight in hauled position.
Figure 4B:
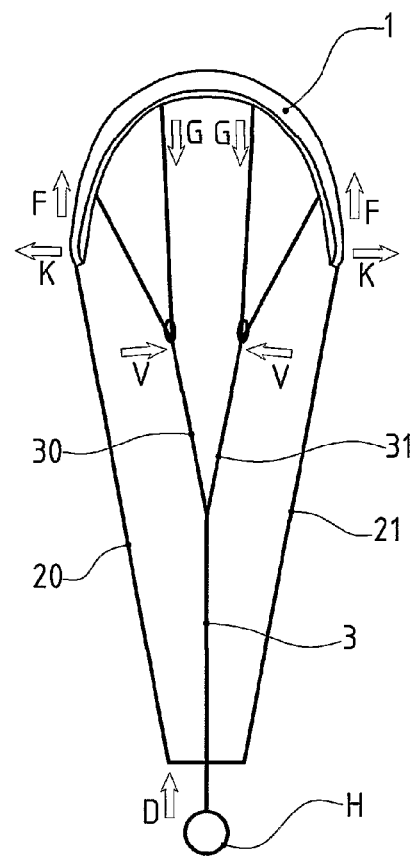
FIG. 4b shows a schematic front view of the same kite during the flight in slacked position.

FIGS. 3a and 4a show the kite 1 in hauled position, while FIGS. 3b and 4b show the same kite 1 in slacked position.

The delta shape of the kite 1 increases its stability, which provides the possibility of extending the area of arrangement M of the upper bearing riggers 32, 33, 34, 35, so as not to reduce the in-flight wing span during the slack, and even of increasing it through a load transfer.

Indeed, as can be seen in FIGS. 3b and 4b, the raising D of the control bar 2 along the bearing rigger 3 induces a change of incidence of the kite 1, through a rise F of the ailerons E and a lowering G of the leading edge 10. The reduction of lift results into an increase of relative drag, which has the double effect of causing the kite 1 to slightly draw back with respect to the pilot H, in a displacement I, and of transferring the point of application of the forces forwards and toward the centre of the kite 1 by displacing V the pulleys P on the upper riggers 32, 33, 34 and 35.

It should be noted that such a transfer also occurs even if there are no pulleys P, but then generating a force tending to reduce the in-flight wing span of the kite, which tends to dampen the effects of the system. Such a configuration can be of some interest for the kites having a reduced surface, in order to reduce their vivacity.

Furthermore, the raising D of the control bar 2 along the bearing rigger 3 induces a slight increase K of the wing span at the level of the ends 14 and 15 of the kite 1, as well as a slight increase of the incidence participating in a free tilting of the kite 1 about its axis of pitching.

The features of the kite 1 according to the invention have other advantages than those related to the handling in flight, and namely from the safety viewpoint. Indeed, these features permit a design different from the systems presently known as "fifth rigger".

Figure 5:
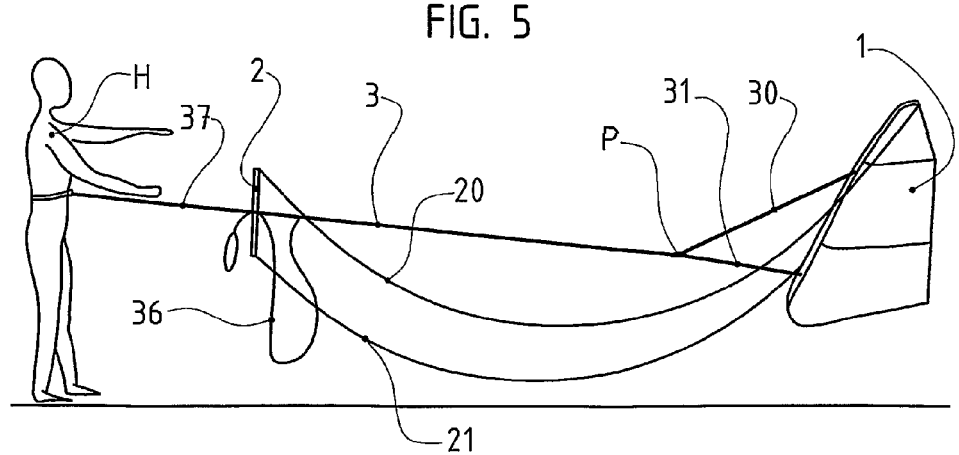
FIG. 5 shows a schematic elevation profile view of the same kite during its use.

Thus, when referring now to FIG. 5, one can see that the bearing rigger is ramified into two riggers 36 and 37, both fixed to the harness of the pilot H, whereby the main rigger 36 can however be dropped.

In praxis, after having released the bar 2 and dropped the main rigger 36, the bar 2 freely slides upwards, which results into a tilting motion of the kite 1, thus completely cancelling its power. The pulley P, which the bearing rigger 3 is connected to, moves towards the kite 1, thus stabilizing the latter on the upper riggers 32, 33, 34, 35, which permits a smooth ditching, without generating any traction likely to be prejudicial to the pilot P, who remains connected to the kite 1 by the rigger 37.

Thanks to its specific delta shape as well as to its adapted system for managing the traction power, the direction and the transient manoeuvres, the kite 1 according to the invention thus largely improves the flight qualities and the handiness manoeuvrability of such a kite.

What is claimed:

1. An inflatable traction kite and system for managing the traction power, the direction, and the transient maneuvers of said kite, comprising:
    a wing having:
        a leading edge which intersects a line (L) separating the kite into two opposite half-wings at a forward central point (A), and the leading edge has, when laid flat, a curvature such that, for each of the half-wings of the kite, an angle ($\alpha$) formed by the tangent (S) to said forward central point (A) with the tangent (T) at a given point (B) is increasing when said given point (B) moves from the forward central point (A) to a respective end of the kite along the leading edge, wherein, in the first one-third of each of said half-wings of the kite, from the forward central point (A) to the respective end, said angle ($\alpha$) is larger than 15°, and
        a trailing edge which includes, when laid flat, a forward sweep of the trailing edge at each lateral extremity portions of the kite;
    bearing riggers, comprising ramifications, connected to the leading edge of the kite in a median portion of the kite; and
    control riggers connected to the lateral extremity portions of the kite, external to said median portion, said control riggers being used for managing the direction and the trim,
    wherein the kite has, during flight, an arch shape with a ratio between a flat wing span and an in-flight wing span larger than 1.5, and
    wherein the kite has approximately a delta shape during flight.

2. The traction kite according to claim 1, wherein the leading edge has a curvature such that, for each half-wing of the kite, a second angle ($\beta$) between the tangent (S) to the forward central point (A) and a straight line connecting the latter to a point (J) located on the leading edge at the half of each half-wing of the kite is larger than 15°.

3. The traction kite according to claim 1, wherein:
    (i) the bearing riggers include a ramified bearing rigger arranged in a median portion (M) of the kite that represents between seven-tenths and eight-tenths of the entire wing span, and
    (ii) the control riggers used for managing the direction and the trim include two control riggers that are integral with the kite, external to said median portion (M).

4. The traction kite according to claim 1, wherein bearing riggers include a ramified bearing rigger, wherein the ramified bearing rigger is ramified into two secondary riggers, wherein each secondary rigger is ramified into two upper riggers, wherein each upper rigger is connected to the same respective half-wing of the kite, wherein one of the upper riggers is connected to an outer edge of the median portion (M).

5. The traction kite according to claim 4, wherein at least one of the ramifications is made through a pulley (P).

6. The traction kite according to claim 2, wherein:
    (i) the bearing riggers include a ramified bearing rigger arranged in a median portion (M) of the kite that represents between seven-tenths and eight-tenths of the entire wing span, and
    (ii) the control riggers used for managing the direction and the trim include two control riggers that are integral with the kite, external to said median portion (M).

7. The traction kite according to claim 2, wherein the bearing riggers include a ramified bearing rigger, wherein the ramified bearing rigger is ramified into two secondary riggers, wherein each secondary rigger is ramified into two upper riggers, wherein each upper rigger is connected to the same respective half-wing of the kite, wherein one of the upper riggers is connected to an outer edge of the median portion (M).

8. The traction kite according to claim 3, wherein the bearing riggers include a ramified bearing rigger, wherein the ramified bearing rigger is ramified into two secondary riggers, wherein each secondary rigger is ramified into two upper riggers, wherein each upper rigger is connected to the same respective half-wing of the kite, wherein one of the upper riggers is connected to an outer edge of the median portion (M).

9. The traction kite according to claim 6, wherein the bearing riggers include a ramified bearing rigger, wherein the ramified bearing rigger is ramified into two secondary riggers, wherein each secondary rigger is ramified into two upper riggers, wherein each upper rigger is connected to the same respective half-wing of the kite, wherein one of the upper riggers is connected to an outer edge of the median portion (M).

10. The traction kite according to claim 7, wherein at least one of the ramifications is made through a pulley (P).

11. The traction kite according to claim 8, wherein at least one of the ramifications is made through a pulley (P).

12. The traction kite according to claim 9, wherein at least one of the ramifications is made through a pulley (P).

13. The traction kite according to claim 1, wherein the angle ($\alpha$) at the first one-third of each half-wing is 21°.

* * * * *